Sept. 21, 1937.  A. VOGT  2,093,666

PROCESS FOR TREATING IRON AND IRON ALLOYS

Filed Oct. 31, 1935

Inventor
Adolf Vogt.
per Karl A. Mayr
Attorney.

Patented Sept. 21, 1937

2,093,666

UNITED STATES PATENT OFFICE 2,093,666

PROCESS FOR TREATING IRON AND IRON ALLOYS

Adolf Vogt, Tschechnitz, near Breslau, Germany, assignor to Dr. Alexander Wacker, Gesellschaft für Elektrochemische Industrie G. m. b. H., Munich, Germany, a corporation Application October 31, 1935, Serial No. 47,618
In Germany November 23, 1934

11 Claims. (Cl. 75—60)

The present invention relates to a process and apparatus for removing oxidizable matters which, at the temperature at which the process is carried out, are in gaseous or vaporous state from materials in hot liquid state, particularly for removing carbon from iron and iron alloys in liquid state.

An object of the present invention resides in the provision of a process for removing carbon from matters such as iron or iron alloys consisting in subjecting said matters to heat until they are in a liquid state and then treating the molten matters with gas of low pressure and containing a large percentage of oxygen.

A further object of this invention resides in the provision of a process for removing carbon from matters such as iron or iron alloys consisting in subjecting said matters to heat until they are in a liquid state and then treating the molten matters with gas containing a high percentage of oxygen and gradually reducing the pressure of the gas during the decarbonizing process.

Another object of the present invention is to provide a process and apparatus for removing carbon from matters such as iron or iron alloys in a hot molten state consisting in enclosing said matters in a container, in gradually reducing the pressure within said container and in treating said matters with pure oxygen or a gas of high oxygen content.

A further object of the present invention is the provision of a process for removing carbon from matters such as iron or iron alloys in hot molten state consisting in enclosing said matters in a container, in maintaining a low pressure within said container, and in treating said matters with pure oxygen or a gas of high oxygen content.

Another object of this invention is the provision of a process for removing carbon from matters such as iron or iron alloys in a hot molten state consisting in enclosing said matters in a container, in reducing the pressure within said container, and in treating said matters with pure oxygen or a gas of high oxygen content, and in controlling the level and boiling action of said liquid by controlling the pressure within said container.

A further object of this invention is to provide a process for removing carbon from matters such as iron or iron alloys in a hot molten state consisting in enclosing said matters in a container, in reducing the pressure within said container, in treating said matters with pure oxygen or gas with high oxygen content, and in controlling the level and boiling action of said liquid by blowing air into a particularly hot region of said container.

Further and other objects of the present invention will be hereinafter set forth in the accompanying specification and claims and shown in the drawing which, by way of illustration, show what I now consider to be a preferred embodiment of my invention.

I have found that, when oxygen or a gas of high oxygen content is used at low pressure for treating materials, particularly metals and alloys in a hot molten state, oxidizable matters, for example carbon, can be removed, whereby all heat required is supplied by the reaction process itself and no considerable additional heat need be supplied. Such oxidizable matters can be almost completely removed by using my proposed process. For example, the carbon content of ferro-chrome can be reduced to 0.06% and less by my new process. The pressure in the treating chamber is preferably controlled in such a manner that it is gradually reduced as the decarbonizing process goes on. I may also reduce the pressure before the oxygen enters the reaction chamber and maintain a low pressure during the treatment with oxygen or I may alternatingly maintain an atmospheric pressure and a pressure which is below atmospheric pressure so that the treatment takes place periodically at higher and lower pressures. This process can be improved by adding deoxidizing matters such as ferro-silicon to the material in hot liquid state during the treatment with low pressure oxygen. For carrying out the process in a commercial manner, preferably a pear-shaped converter is used in horizontal position for avoiding throwing-out of the molten material. After filling the converter, for example, with molten ferro-chrome containing 1% carbon, it is closed and the pressure gradually reduced and, at the same time, oxygen or a gas containing a high percentage of oxygen is permitted to enter and—as aforesaid—deoxidizing matters are thrown into the converter. If the molten material expands too much owing to the reduced pressure, a gas, for example, air, is allowed to enter the converter for increasing the pressure therein. In order to prevent explosions, such air must be introduced into a hot zone within the converter and not into the part through which the gases containing carbon-oxides, etc. are withdrawn from the converter. For practical purposes the process may be started with a pressure of about 25" Hg which is gradually reduced to a pressure of say ½" Hg and less. The carbon content is then reduced to about 0.07%.

Other materials such as ferro-vanadium may be treated in the same manner. After the treatment of the hot molten materials with low pressure oxygen, further deoxidizing matters such as ferro-silicon may be added and also metals, for example, nickel may be added for producing any desired alloy.

An apparatus according to my invention for carrying out my new process is illustrated by way of example in the two figures of the drawing.

Like parts are designated by like numerals in both figures of the drawing.

Figure 1:
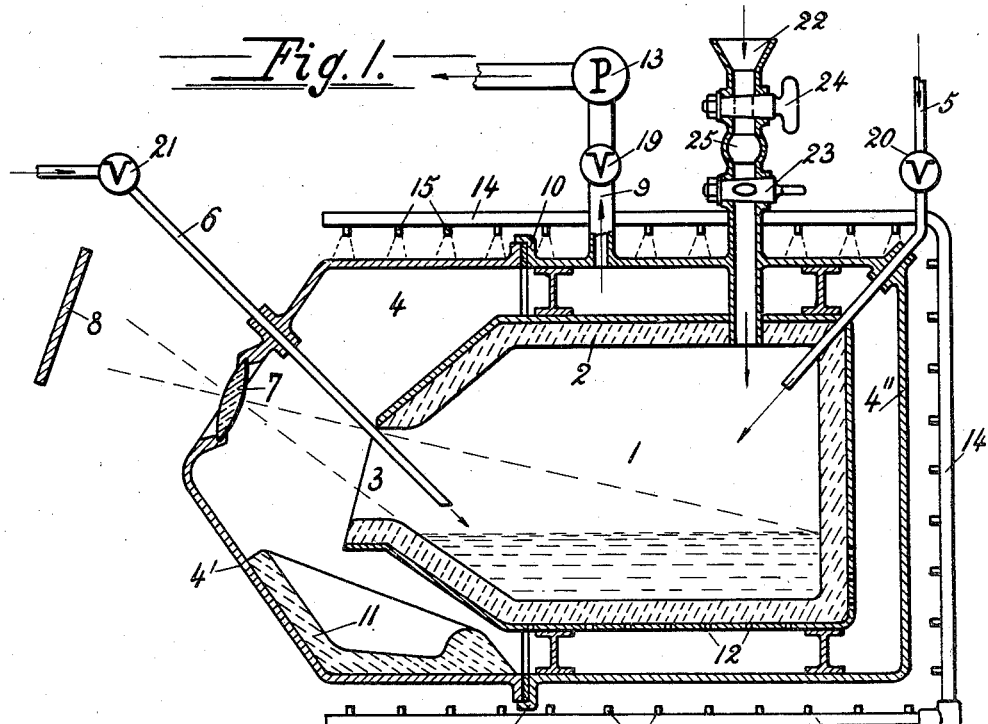
Fig. 1 is a diagrammatic cross sectional view of an apparatus according to my invention.

In the figures, 1 is a container for holding the molten material and having a lateral opening 3; the container is lined with a layer 2 of high temperature resisting material. It is advisable to provide openings 12 in container 1 which are round, slot-shaped or of other suitable configuration, and located particularly in that part of the container which is below the level of the surface of the molten material. These openings permit escape of air which may be contained in layer 2 through the exterior wall of container 1 so that little or no air goes into the bath of molten material when evacuation of the container is started. The pressure prevailing on the outside of openings 12 is lower than the pressure on the inside of lining 2 on which the molten material rests, and the air contained in lining 2 goes the easy way which is through holes 12 and not through the bath when evacuation is started. Container 1 is located within a closable chamber 4 which is of sufficient size to provide space all around container 1 and between container 1 and chamber 4. Conduits 5 and 6 are provided extending through the walls of chamber 4 into the interior of container 1. One conduit serves for introducing oxygen or gases of high oxygen content, the other for introducing air or gas for controlling the pressure in container 1 and chamber 4. Air and gases are withdrawn from chamber 4 through duct 9 which leads to pump 13 and produces the desired low pressure within chamber 4 and container 1. A valve 19 may be provided in duct 9 for controlling the amount of gas removed and the pressure within the chamber.

Figure 2:
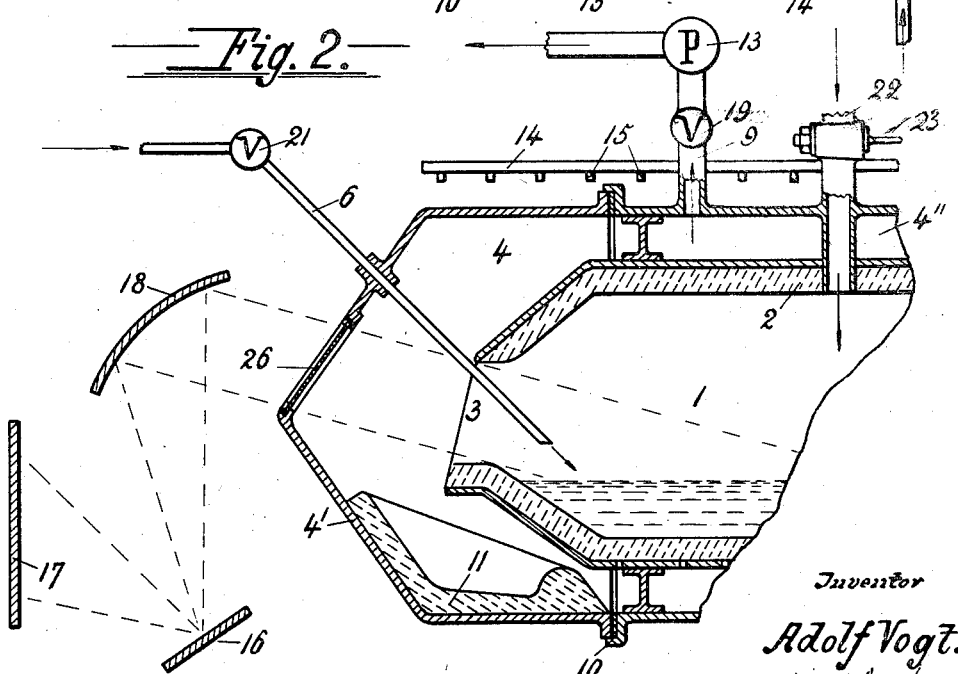
Fig. 2 is a diagrammatic showing of a part of the apparatus shown in Fig. 1 and showing a modification of the means for observing the interior of the apparatus in operation.

Chamber 4 is preferably made up of two sections 4' and 4" which are disconnectably interconnected by means of flange 10. The part of section 4' located underneath opening 3 of container 1 is lined with high temperature resisting material 11 which has the shape of a tray. Opposite the lateral opening 3 of container 1, a lens 7 is inserted into the wall of chamber 4' which projects a picture of the surface of the bath of molten material within container 1 to a surface 8 which is outside of chamber 4 and visible to the operator even when the latter is remote from chamber 4. Supervision of the process is thus possible in an indirect manner which is more convenient and less dangerous. Instead of a lens, other optical devices such as concave mirrors or the like may be used. Such an arrangement is shown in Fig. 2. The image of the bath surface is projected through a transparent plate 26 to the outside and by means of concave mirror 18 to mirror 16 and therefrom to screen 17.

As long as the molten material is treated with gases at atmospheric pressure, the apparatus shown in the figure may be used in upright position, i. e., with opening 3 at the upper end of the apparatus and part 4', which is on the left of flange 10 on the drawing, removed. The horizontal position as shown with opening 3 at the side and part 4' tightly connected to part 4" is used when carrying out the process at a pressure which is below atmospheric pressure. As soon as pump 13 is started, a vacuum is developed in chamber 4 and container 1. The gases for treating the molten material are introduced through conduit 5 and directed towards the surface of the bath of molten material. If the pressure within container 1 becomes too low and the molten material foams or rises too high, gas or air is introduced through conduit 6. Conduits 5 and 6 are provided with valves 20 and 21, respectively, for controlling the amount of gas flowing therethrough. Material flowing over through opening 3 is collected in the tray formed by lining 11. The apparatus may be cooled by spraying water on to the outside of chamber 4. Pipe 14 having nozzles 15 serves for this purpose.

For introducing deoxidizing matters into container 1 during the process, a conduit 22 is provided having two valves 23 and 24 with a chamber 25 in between. The matters are first introduced into chamber 25 with valve 24 open and valve 23 closed. Then valve 24 is closed and valve 23 opened so that the matters drop into container 1.

When the treating process is completed, vacuum pump 13 is stopped, and part 4' of chamber 4 is removed after the pressure inside the chamber has reached atmospheric pressure. The molten material can then be taken out by tilting container 1.

While I believe the above described embodiments of my invention to be preferred embodiments, I wish it to be understood that I do not desire to be limited to the exact details of process, design and construction shown and described, for obvious modifications will occur to a person skilled in the art.

What I claim is:

1. The process of removing oxidizable matters from iron or iron alloys in hot liquid state comprising blowing oxygen on to the surface of said iron or iron alloys and maintaining on said surface a pressure which is below atmospheric pressure.

2. The process of removing oxidizable matters from iron or iron alloys in hot liquid state comprising blowing a gas mixture containing free oxygen and inert gases on to the surface of said iron or iron alloys and maintaining on said surface a pressure which is below atmospheric pressure.

3. The process of removing oxidizable matters from iron or iron alloys in hot liquid state comprising blowing oxygen on to the surface of said iron or iron alloys and maintaining on said surface a pressure which is below atmospheric pressure and addition of deoxidizing matters to said materials during the low pressure treatment with oxygen.

4. The process of removing oxidizable matters from iron or iron alloys in hot liquid state comprising blowing a gas mixture containing free oxygen and inert gases on to the surface of said iron or iron alloys and maintaining on said surface a pressure which is below atmospheric pressure and addition of deoxidizing matters to said iron or iron alloys during the low pressure treatment with gas.

5. The process of removing oxidizable matters from iron or iron alloys in hot liquid state comprising treatment of said iron or iron alloys with oxygen at a pressure which is gradually reduced from atmospheric pressure to a pressure below atmospheric pressure.

6. The process of removing oxidizable matters from iron or iron alloys in hot liquid state comprising treatment of said iron or iron alloys with a gas mixture containing free oxygen and an inert gas at a pressure which is gradually reduced from atmospheric pressure to a pressure below atmospheric pressure.

7. The process of removing oxidizable matters from iron or iron alloys in hot liquid state and enclosed in a chamber comprising treatment of said iron or iron alloys with a gas containing free oxygen at a pressure which is below atmospheric pressure and control of the pressure within said chamber by removing gas from said chamber and introducing said gas containing free oxygen to a particularly hot zone of said chamber and above the bath whenever the pressure in said chamber reaches an undesired low value.

8. The process of removing oxidizable matters from iron or iron alloys in hot liquid state comprising blowing oxygen on to the surface of said iron or iron alloys and maintaining on said surface a pressure which is below atmospheric pressure and supplying all heat required by the reaction process itself.

9. The process of removing oxidizable matters from iron or iron alloys in hot liquid state comprising blowing a gas mixture containing free oxygen and an inert gas on to the surface of said iron or iron alloys and maintaining on said surface a pressure which is below atmospheric pressure and supplying all heat required by the reaction process itself.

10. The process of removing oxidizable matters from iron or iron alloys in hot liquid state comprising blowing oxygen on to the surface of said iron or iron alloys and maintaining on said surface a pressure which is below atmospheric pressure, addition of deoxidizing matters to said iron or iron alloys during the low pressure treatment with oxygen, and supplying all heat required by the reaction process itself.

11. The process of removing oxidizable matters from iron or iron alloys in hot liquid state comprising blowing a gas mixture containing free oxygen and an inert gas on to the surface of said iron or iron alloys and maintaining on said surface a pressure which is below atmospheric pressure, addition of deoxidizing matter to said iron or iron alloys during the low pressure treatment with gas, and supplying all heat required by the reaction process itself.

ADOLF VOGT.